Figure 1:
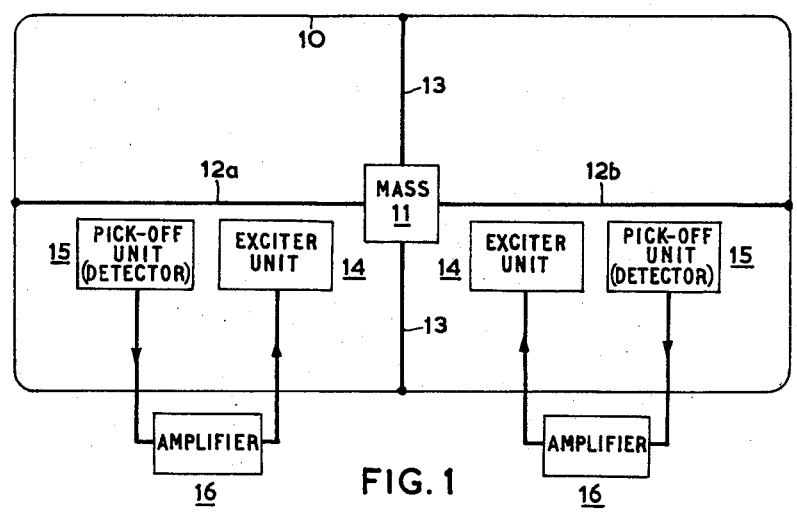

March 17, 1964  L. H. BEDFORD  3,124,961
ACCELEROMETERS
Filed Sept. 26, 1957  2 Sheets-Sheet 1

Inventor:
Leslie Herbert Bedford
By:
Stevens, Davis, Miller & Mosher
Attorneys

March 17, 1964  L. H. BEDFORD  3,124,961
ACCELEROMETERS
Filed Sept. 26, 1957  2 Sheets-Sheet 2

Inventor:
Leslie Herbert Bedford
By Stevens, Davis, Miller & Mosher
Attorneys

United States Patent Office 3,124,961
Patented Mar. 17, 1964

3,124,961
ACCELEROMETERS
Leslie Herbert Bedford, London, England, assignor to The English Electric Company Limited, London, England, a British company
Filed Sept. 26, 1957, Ser. No. 686,537
8 Claims. (Cl. 73—497)

This invention relates to accelerometers of the kind referred to hereinafter as "the kind set forth," in which the natural frequency of a tensioned string is applied to afford a measure of the acceleration to which a mass is subjected.

In such an accelerometer a mass is usually supported by two pre-tensioned wires which are caused to vibrate at their natural frequencies. When the mass is accelerated along a direction in line with the wires, the tension in one wire increases and there is a corresponding decrease in the tension of the other wires. As a result, the natural frequencies of vibration of the two wires change in opposite senses and a sensitive measure of the acceleration is afforded by the change in the difference frequency.

In a simple form of the device a mass is supported between two identical strings (the word "strings" is used as a generic term including wires since, as will be readily appreciated from a comparison with musical instruments, non-metallic materials may be used to replace the wire). For zero acceleration in the string direction (the acceleration of gravity being included by the term "acceleration") the two strings have identical modes of vibration and if they are caused to vibrate at corresponding natural frequencies there will be no difference between their frequencies. However, when the device is subject to acceleration along the string direction the strings vibrate at different frequencies and the difference frequency is directly related to the acceleration in a direct but non-linear manner. It can be shown that the relationship between the difference frequency and the acceleration becomes a linear one provided the pre-tension of the strings is controlled so that the sum of the two frequencies of vibration is a constant.

Various forms of electro-mechanical transducer elements may be used for the purpose of controlling the tension of the strings. For example, the phenomenon of magnetostriction may be applied.

The present invention relates to a preferred method by which the tension of the strings may be controlled thermally.

According to the invention, an accelerometer of the kind set forth comprises an assembly formed by a frame structure, a suspended body, and two strings which hold one another in tension by supporting the body from the frame structure, thermal means for controlling the tension of the two strings adapted to heat and cool the assembly to promote expansion or contraction in a sense which will change the stress in the strings, exciter means operative to maintain both strings in a state of vibration, detector means responsive to the vibration of the strings and operative to produce electrical signals which are a measure of the string frequencies, and control means responsive to these signals and operative to govern the thermal means to cause the string frequencies to have a predetermined relationship which is independent of acceleration.

In a simple accelerometer of the kind set forth and in which said body is supported by two identical strings which are excited to vibrate in the same frequency mode said thermal means are controlled in accordance with the sum of the string vibration frequencies to maintain this sum constant under varying acceleration conditions. In less simple accelerometers it may be required to control the tension in the strings in accordance with more complex functions of the string frequencies. This will be understood with reference to the co-pending patent application of Leslie Herbert Bedford for Accelerometers, Serial No. 686,538, filed September 26 1957, now Patent No. 3,057,208. In this application various forms of accelerometer systems are described in which the string frequencies are not identical in the undisturbed state and in order to secure linear accelerometer characteristics it is necessary to condition the accelerometer so as to maintain complex functions of the string frequencies constant.

This invention is concerned with the means by which the tension in the strings can be controlled in response to a suitable control signal; the nature of this signal is irrelevant to the invention in its broadest sense provided it has a useful purpose and is governed by the state of vibration of the accelerometer strings. The useful purpose may merely be to provide temperature compensation. Although temperature compensation can be achieved by using the same material for all structural members of the accelerometer this may not suit the design requirements in some cases. In such cases it may be found to be desirable to compensate for temperature change by thermal means which are not directly responsive to the ambient temperature of the accelerometer but which are governed by the frequencies of vibration of the accelerometer strings.

According to a feature of the invention, said thermal means comprise means for introducing heat into the strings at a controlled rate and means for cooling the strings.

According to a further feature of the invention, said strings are formed by metal wire and heat is introduced into a wire by passing a controlled electrical current through it, there being a natural cooling effect owing to the maintenance by the electrical current of a temperature differential between the wire and its surrounds.

According to a still further feature of the invention, the wires supporting the body form, with this body and the frame structure, a closed electrical path into which a controlled electrical current is induced by transformer means comprised by said thermal means, said path forming, in effect, a short-circuited secondary winding, the primary winding of the transformer means being responsive to an electrical output supplied by said control means.

According to another feature of the invention, said assembly further comprises at least one additional pair of strings in order to facilitate the measurement of acceleration in more than one direction, and said thermal means subject each string of a pair to the same degree of heating or cooling.

Other features of the invention relate to thermal screening and will be evident from the following description.

Figure 2:
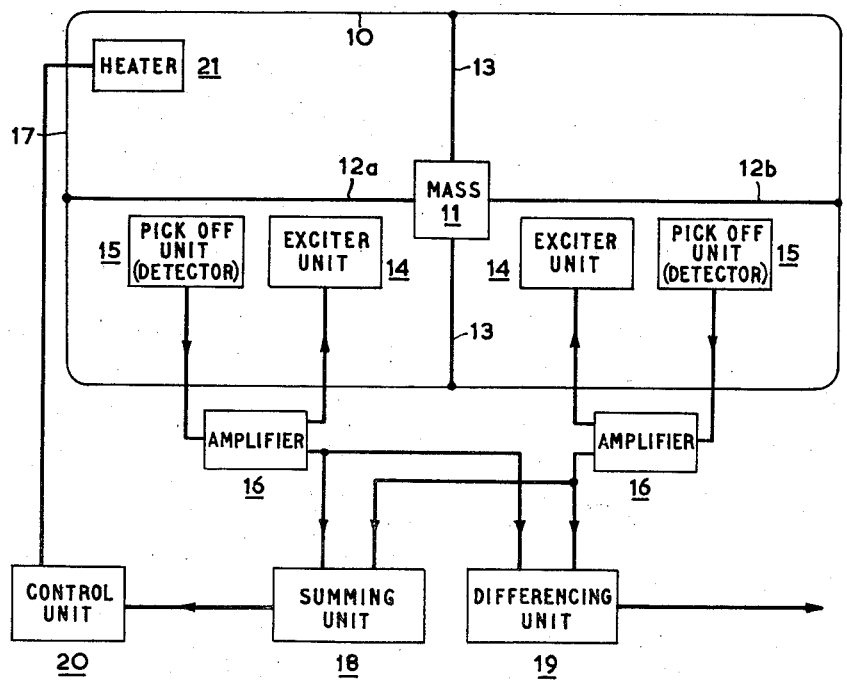
Figure 3:
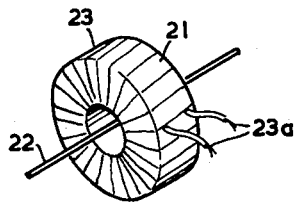
Figure 5:
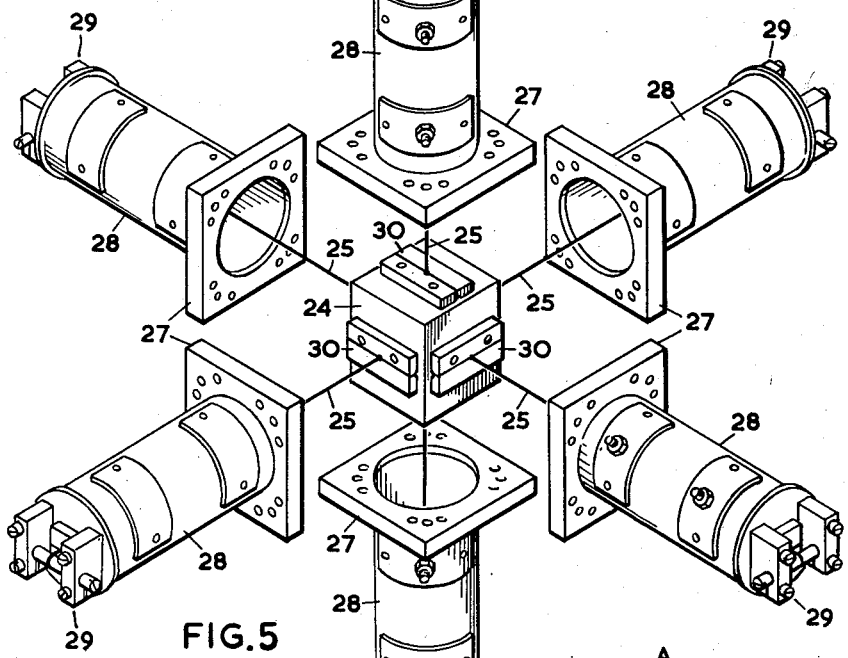
Figure 4:
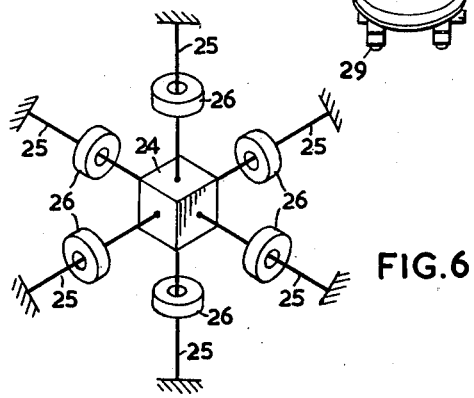
Figure 6:
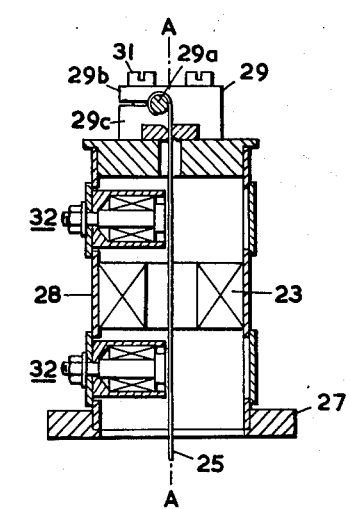

The invention will now be described with reference to the accompanying drawings, in which:

FIG. 1 illustrates an accelerometer of the kind set forth,

FIG. 2 illustrates in schematic form an accelerometer system embodying the invention, FIG. 3 illustrates diagrammatically an inductive device by which an electrical signal may be applied to introduce heat into an accelerometer string, FIG. 4 illustrates a three dimensional form of the system embodying the invention, FIG. 5 shows the constructional details of a three dimensional form of accelerometer system, and FIG. 6 shows an enlarged sectional view of one of the six exciter units shown in FIG. 5.

In FIG. 1 a schematic representation of an accelometer of the kind set forth is shown.

A rigid housing 10 contains a mass 11 which is supported from the walls of the housing by two wires 12a, 12b and four ligaments 13 arranged around the mass in quadrature (only two are shown). The wires are pre-tensioned. Adjacent to each wire is an exciter unit 14 and a pick-off unit 15 which serve respectively to promote transverse vibration in the wire and to provide information relating to the frequency at which the wire is vibrating. Amplifier units 16 connected between each of the units 14 and 15 are adapted to promote the vibration of the wires at their natural fundamental frequencies. These amplifiers also provide output signals which may be applied by means not shown in the drawing to measure any change in the difference between these natural frequencies.

It may be shown by analysis that, subject to the conditions that the wires 12a and 12b are identical and that the pre-tension in the wires is sufficiently small, the fundamental frequencies $f_1$ and $f_2$ at which the respective wires vibrate are related to the acceleration $a$ in the direction of the wires by the relationship:

$$a \propto (f_1 - f_2)(f_1 + f_2) \qquad (1)$$

This relationship shows that if the accelerometer is continuously conditioned so that $f_1 + f_2$ is maintained constant, the difference frequency obtained by comparing the frequencies $f_1$ and $f_2$ bears a directly proportional linear relationship to the acceleration $a$.

A particular advantage resulting from a linear proportionality betwen acceleration and a frequency difference is that a beat frequency can be produced which can be accurately integrated to count, in effect, the number of cycles and thus obtain an accurate measure of the change of velocity of the system. This argument presupposes that the system can take into account the acceleration of gravity.

This invention relates to a method by which the accelerometer can be conditioned in accordance with the frequencies of vibration of the accelerometer strings. A control can be exercised over the accelerometer by adjusting the tension in the wires 12a and 12b. By this invention the wires have an initial tension which is normally reduced by introducing heat which expands the wires. A control of the tension is thus obtained by increasing or decreasing the rate at which heat is applied.

In FIG. 2 a block schematic diagram shows the general circuit arrangement of an accelerometer incorporating the invention.

The accelerometer shown generally at 17 has the same form as that shown in FIG. 1, and the reference numerals 10–16 correspond to those in that figure. Electrical signals having frequencies equal to those of vibration of the wires 12a and 12b are available from the corresponding amplifier units 16. These signals are supplied to frequency sum and difference units 18 and 19 respectively. The unit 19 affords an output signal which is a measure of the difference between the frequencies of vibration of the wires 12a and 12b. This signal constitutes the output signal of the accelerometer system. The unit 18 supplies a signal which is a measure of the sum of the two wire frequencies and this signal is compared by the unit 20 with a reference frequency to provide an error quantity, which can be positive or negative and which represents the difference between the sum of the two frequencies of vibration and the reference frequency. The error quantity is supplied as an output by the unit 20 and is fed to thermal means 21 which are associated with the accelerometer 17 and cause the tensions of the wires 12a and 12b to vary in accordance with the error quantity.

Without resorting to a form of differential heating system it is difficult to promote a controlled contraction of the frame structure, represented schematically by the housing 10, or the strings 12a and 12b. However, an adequate response can normally be obtained by relying on the normal rate of contraction arising from a natural cooling. In such a case a zero error quantity would be represented by a steady rate of heating of the accelerometer. When the error quantity becomes negative the rate of heating must be reduced or increased as the case may be in order that the whole system may tend to be stable. Similarly, when the error quantity becomes positive the rate of heating must vary in the opposite sense. It is, of course, desirable to choose the rate of heating for zero error quantity so that the rates of response to negative and positive error quantities are about the same.

The thermal means 21 may take a variety of forms. For example, the means may be regarded generally as a form of heater within the housing 10. The heat generated raises the temperature of the wires 12a and 12b causing them to expand and their tensions to decrease. As a result the sum of their frequencies of vibration decreases causing the error quantity supplied by the unit 20 to become negative. This must correspond to a decrease in the rate of heat supplied by thermal means 21 which, in turn, will allow the wires 12a and 12b to contract, and so on. The above argument is based upon the assumption that the frame structure represented by the housing 10 is rigid and for the accelerometer control system to function in the manner described the housing 10 must not be equally affected by the heat generated by the means 21. This would normally be assured by the fact that heat transfer must take place through the housing and therefore it cannot be subjected to the same temperature cycle as the strings. It may be convenient in some designs to utilize different materials for the frame structure and the wires supporting the mass 11 in order to render the tension in the wires dependent upon the temperature of the whole structure.

In a preferred form of accelerometer embodying the invention heat is introduced directly into the wires 12a and 12b. By generating the heat in the wires themselves the actual cooling of the wires as opposed to the frame structure supporting the wires can be utilized and an accelerometer having a rapid rate of response to this thermal control can therefore be obtained.

Heat may be generated in a wire by passing an electrical current through it and since the prime purpose of the current is the generation of heat, the larger this current the better. Accordingly it is highly desirable for the accelerometer wire to form part of a single turn secondary winding of a transformer. Apart from this, the problems which would be involved if an attempt were made to pass an electric current through the accelerometer wires by applying a P.D. across them are obviated.

In FIG. 3 an inductive device suitable for introducing heat into an accelerometer wire is shown. It comprises simply a circular magnetic core 21 which embraces the accelerometer wire 22 and has a toroidal primary winding 23 provided with leads 23a. For optimum sensitivity it is desirable to have as uniform a heating and cooling of the aecelerometer wires as possible, and it is therefore desirable to have one or more of the devices shown in FIG. 3 on each of the wires in an accelerometer.

It becomes essential to use the same number of these devices per wire when the accelerometer system has the three-dimensional form shown in FIG. 4. Here, a mass 24 is supported by three pairs of wires, each pair having a common direction which is mutually at right angles to those of the other pairs. The accelerometer includes six identical inductive devices 26 which are mounted one on each of the wires 25. Identical signals, representing the thermal control signal appropriate to a particular acceleration direction are supplied to the appropriate pair of devices 26. This ensures that whatever current flows in one wire of a pair the same current will flow through the other wire of the pair and there is therefore no interference between the heating currents in the various directions.

The apparatus required for exciting and detecting the vibration of the wires and producing control signals for the device 26 is not represented in FIG. 4, but it would take the same general form as that indicated in FIG. 2, there being three distinct control systems and, of course, three output signals.

In a practical embodiment of the three-dimensional form of accelerometer shown in FIG. 4 it is desirable, though not essential, to arrange for a cooling of the wires that is substantially independent of the temperatures of the other wires. For this purpose the wires should be screened. Preferably they should be mounted within cylindrical metal containers and arranged along the longitudinal axes of these containers.

The detailed constructional features of a three-dimensional form of accelerometer of the kind just described are shown in FIGS. 5 and 6. FIG. 5 shows a projection view of an accelerometer whose housing has been broken apart to expose the accelerometer mass. FIG. 6 shows a cross-sectional view through central axes of an exciter system for one of the six accelerometer wires shown in FIG. 5.

In FIG. 5 the accelerometer is shown to comprise a mass 24 which is supported by three pairs of wires 25 and located by these wires at the centre of a cube-like housing. This housing comprises six side plates 27 which are shown to be broken apart in the drawing but are normally bolted together to form a closed container. The wires 25 extend through central apertures in the side plates 27 and pass through cylindrical containers 28 to clamping fixtures 29 at the remote ends of these containers. The containers 28 are fixed to the plates 27 so that when the six plates are bolted together the plates and the containers 28 together form a frame structure for the accelerometer system. The wires 25 are fixed to the mass 24 by clamping means 30 and the tension in the wires can be adjusted as well as the position of the mass 24 within the accelerometer housing by adjusting the clamping fixtures 29.

The arrangement of the clamping fixtures 29 is more clearly shown in FIG. 6. Here, it is shown that a wire 25 passes round a roller 29a. This roller can be turned by a spanner or screw-driver to adjust the tension in the wire 25 and the roller can be locked at each end in an adjusted position by tightening a screw 31 which clamps the roller 29a between two bracket members 29b and 29c of the clamping fixture 29.

The wire 25 shown in FIG. 6 to lie along the central axis A—A of the cylindrical container 28. This container 28 also houses a toroidal primary winding 23 whose function has already been described. The means for exciting the vibration of the wire 25 are shown at 32. These means comprise two exciter units which are electro-magnetic devices adapted to apply a magnetic force of attraction to the wire 25. These exciter units 32 also function as the pick-off units 15 already mentioned with reference to FIGS. 1 and 2 since under resonant conditions the impedance of the exciter units is a minimum and this is a condition which the electrical circuit used to supply the units can detect and respond to. The wire 25 is, for this purpose, composed of a ferromagnetic material and is disposed closely adjacent the pole faces of an exciter magnet so as to form in effect a yoke member in the flux circulation path of the magnetic circuit. By applying suitable electrical control to energize the magnets of the exciter means at 32, the wire 25 can be caused to vibrate at a natural frequency.

With the arrangement shown in FIGS. 5 and 6 much of the heat transfer between a wire 25 and its surrounds take place between the wire and the container 28 housing the wire. Thermal interaction effects between the difference wires are, therefore, mitigated owing to the large thermal capacity of the various parts of the accelerometer frame structure.

What I claim as my invention and desire to secure by Letters Patent is:

1. An accelerometer of the kind set forth, comprising, in combination, an assembly formed by a frame structure, a suspended body, and two strings which hold one another in tension by supporting the body from the frame structure, thermal means for controlling the tension of the two strings adapted to heat and cool the assembly to promote expansion or contraction in a sense which will change the stress in the strings, exciter means for maintaining both strings in a state of vibration, detector means responsive to the vibration of the strings for producing electrical signals which are a measure of the string frequencies, and control means responsive to these signals and operative to govern the thermal means to cause the string frequencies to have a predetermined mathematical relationship which is independent of acceleration.

2. An accelerometer according to claim 1, wherein said two strings are identical, said exciter means operate to vibrate the strings in the same frequency mode, and said control means operate to maintain the sum of the string vibration frequencies constant under varying acceleration conditions.

3. An accelerometer according to claim 1, wherein said thermal means comprise means for introducing heat into the strings at a controlled rate and means for cooling the strings.

4. An accelerometer according to claim 1, wherein said strings are formed by metal wire and said thermal control means operate by the introduction of heat into a wire by passing a controlled electrical current through it, there being a natural cooling effect owing to the maintenance by the electrical current of a temperature differential between the wire and its surrounds.

5. An accelerometer according to claim 3, wherein said assembly further comprises at least one additional pair of strings in order to facilitate the measurement of acceleration in more than one direction, and said thermal means subject each string of a pair to the same degree of heating or cooling.

6. An accelerometer according to claim 4, wherein the wires supporting the body form, with this body and the frame structure, a closed electrical path into which a controlled electrical current is induced by transformer means comprised by said thermal means, said path forming, in effect, a short-circuited secondary winding, the primary winding of the transformer means being responsive to an electrical output supplied by said control means.

7. An accelerometer according to claim 6, which further comprises thermal screening means disposed between the different strings and operative to render the thermal control of different pairs of strings substantially independent.

8. An accelerometer according to claim 7, wherein said thermal screening means comprise individual cylindrical metal containers which house individual strings lying along the longitudinal central axes of the containers.

References Cited in the file of this patent

UNITED STATES PATENTS

| | | |
|---|---|---|
| 1,948,104 | Firestone et al. | Feb. 20, 1934 |
| 1,995,305 | Hayes | Mar. 26, 1935 |
| 2,265,011 | Siegel | Dec. 2, 1941 |
| 2,466,018 | Ferrill | Apr. 5, 1949 |
| 2,725,492 | Allan | Nov. 29, 1955 |
| 2,752,791 | Jarosh et al. | July 3, 1956 |

FOREIGN PATENTS

| | | |
|---|---|---|
| 729,894 | Germany | Dec. 19, 1942 |
| 585,140 | Great Britain | Jan. 30, 1947 |

UNITED STATES PATENT OFFICE
CERTIFICATE OF CORRECTION

Patent No. 3,124,961                          March 17, 1964

Leslie Herbert Bedford

It is hereby certified that error appears in the above numbered patent requiring correction and that the said Letters Patent should read as corrected below.

In the heading to the printed specification, between lines 6 and 7, insert the following:

Claims priority, application Great Britain Oct. 3, 1956

Signed and sealed this 7th day of July 1964.

(SEAL)
Attest:

ERNEST W. SWIDER                                    EDWARD J. BRENNER
Attesting Officer                                          Commissioner of Patents